S. SUSHKO.
BOLT FASTENER OR LOCK.
APPLICATION FILED NOV. 7, 1917.
1,266,081.
Patented May 14, 1918.
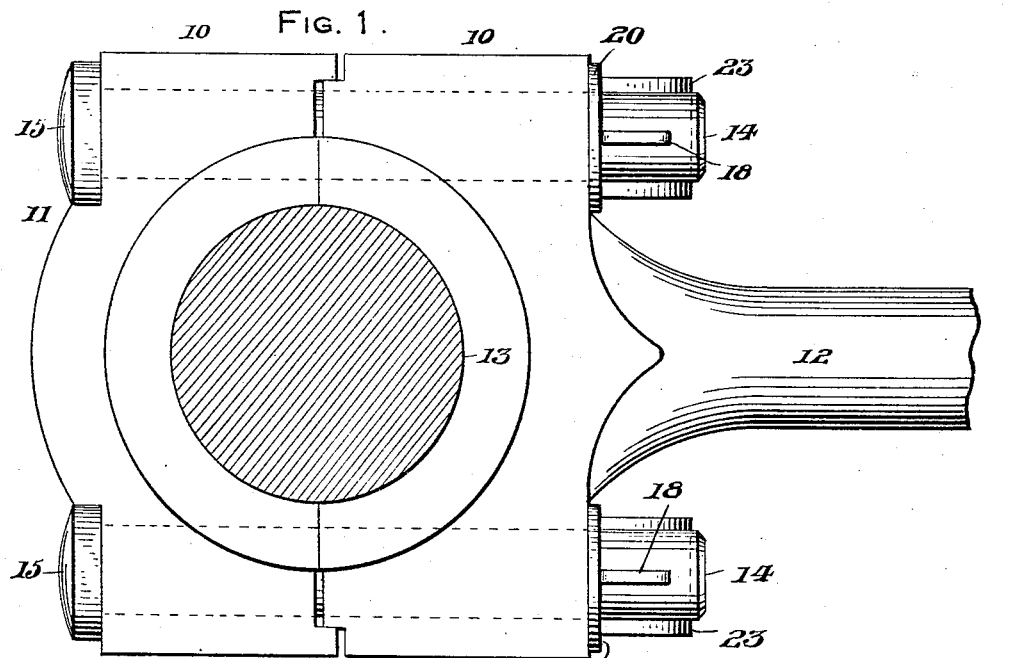
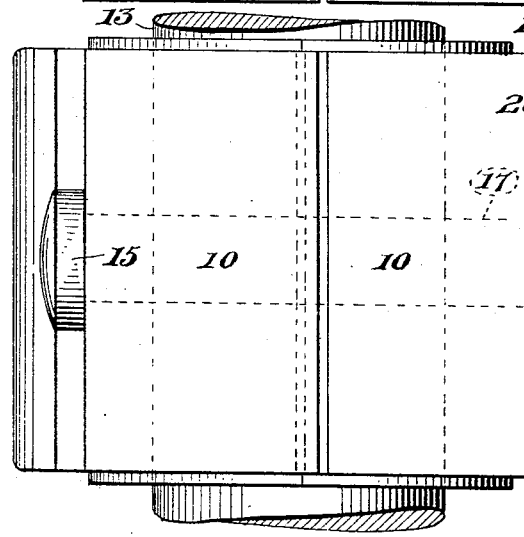
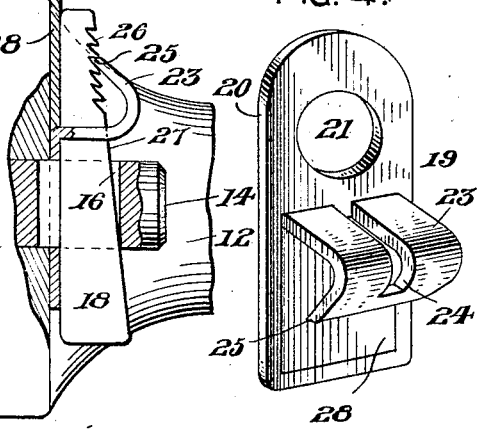
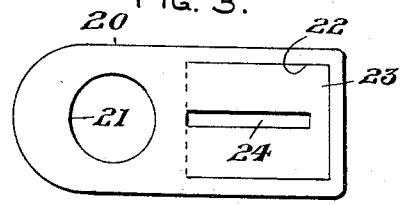
Inventor
S. Sushko
By
Attorney

UNITED STATES PATENT OFFICE.

STEFAN SUSHKO, OF ALLENTOWN, PENNSYLVANIA.

BOLT-FASTENER OR LOCK.

1,266,081.  Specification of Letters Patent.  Patented May 14, 1918.

Application filed November 7, 1917. Serial No. 200,729.

*To all whom it may concern:*

Be it known that I, STEFAN SUSHKO, a citizen of Russia, residing at Allentown, in the county of Lehigh and State of Pennsylvania, have invented certain new and useful Improvements in Bolt Fasteners or Locks, of which the following is a specification.

This invention relates to a certain new and useful bolt fastener or lock.

The primary object of the invention is the provision of a locking means for the bolt especially adapted for employment with cranks, and cross heads whereby the bolt may be adjustably tensioned upon the work and securely fastened in position although being capable of releasing when desirable.

A further object of the device is the provision of a bolt locking means serving the function of a nut and bolt lock, the device being easy and inexpensive to manufacture and readily adjusted into locked position upon the work.

With these general objects in view and others that will appear as the nature of the invention is better understood, the same consists in the novel combination and construction of parts hereinafter more fully described, illustrated in the accompanying drawings and then claimed.

In the drawings forming a part of this application, and in which like designating characters refer to corresponding parts, Figure 1 is a side elevation of a connecting strap for a piston rod and crank arranged with two of my devices operatively arranged thereon, Fig. 2 is an elevational view thereof partially broken away, Fig. 3 is a plan view of the blank from which the device is formed and Fig. 4 is a perspective view of the complete device detached.

This device is designed for securing bolts in their usual positions extending through such members as the sections 10 of a head 11 of a piston rod 12 and is also serviceable in drawing together and holding such sections 10 relatively of the crank shaft or wrist 13 as illustrated in Figs. 1 and 2 of the drawings and in which my device is secured upon the projecting free end 14 of each of the securing bolts 15.

A transverse slot 16 is arranged through the shank 17 of each bolt 15 at a distance suitably spaced from its end 14 while a cotter pin or drift wedge 18 is adapted for sliding through the slot 16 to secure the bolt 15 in position.

An adjustment retaining device 19 is arranged being formed from a plate 20 of sheet metal provided with an opening 21 therethrough adapted for receiving the bolt shank 17 therein for mounting the device 19 upon the projecting end of the bolt 15, as best shown in Fig. 2 of the drawing. A U-shaped cut 22 is provided in the plate 20 providing a rectangular lip 23 adapted to be struck up from the plate 20 and bent toward the plate in V-shaped arrangement as shown in Fig. 4.

A longitudinal slot 24 is arranged in the lip 23 adapted for mounting with the slot 16 of the bolt when the plate 20 is mounted thereon and whereby the pin 18 may be forced longitudinally through the slots 16 and 24 bringing the sharpened free edge 25 of the lip 23 into ratcheting engagement with the rack teeth or notches 26 upon the adjacent inclined face 27 of the wedge pin 18.

A filler block 28 rectangular in form is positioned within the cut away portion formed in the plate 20 when the lip 23 is struck up on the line of severance 22 heretofore noted. The complete operation of the device will be apparent as the operation of the wedge 18 in securing the bolt 15 upon the sections 10 as the usual function performed by such a wedge, while the simple device 19 formed from the plate 20 readily locks the wedge 18 in position as the wedge passes through the slots 16 and 24.

It will be noted that the length of the slot 16 is sufficient for permitting the plate 20 to approach the head of the bolt 15 during the wedging operation, and that the sharpened edge 25 of the lip 23 automatically engages the teeth 26 and holds the wedge 18 adjusted. The block 28 provides an even upper surface for the plate 20 upon which the wedge 18 is adapted to slide and it will be noted that a suitable instrument may forcibly engage the lip 23 from the teeth 26 whenever it is desired to remove the wedge 18 with the bolt 15. The sheet metal from which the plate 20 is formed is preferably slightly resilient and it will be seen that a locking means for bolts is arranged which is easy and inexpensive to manufacture and simple in construction although the same possesses great strength and durability.

What I claim as new is:—

1. A locking means for bolts comprising a sheet metal plate having a bolt receiving opening therein and arranged with an angular cut portion forming a lip struck up and inwardly turned through the plate in V-shaped arrangement, the said lip having a longitudinal wedge receiving slot therethrough.

2. A locking means for bolts comprising a sheet metal plate having a bolt receiving opening therein and arranged with an angular cut portion forming a lip struck up and inwardly turned through the plate in V-shaped arrangement, the said lip having a longitudinal wedge receiving slot therethrough, a filler block for the space under the plate formed by up turning the said lip and a sliding wedge adapted for longitudinal movement through the said slot in contact with the free edge of the said lip.

3. In combination with a bolt having a transverse slot therethrough adjacent its unheaded end, a plate having a circular opening therein through which the said bolt projects, a struck up lip carried by the plate with an opening in the plate therebeneath and with a central slot in the lip, a filler block for said opening beneath the lip, and a locking wedge slidably arranged through the slots of said bolt and lip having teeth upon its oblique edge adjacent the free edge of the lip adapted for the locking reception of said lip edge during the operative movement of the wedge whereby the plate is locked upon the bolt in contact with the work.

STEFAN SUSHKO.

Witness:
T. B. McFADDEN.

Copies of this patent may be obtained for five cents each, by addressing the "Commissioner of Patents, Washington, D. C."